March 28, 1967  S. B. SAMPLE  3,311,810
STATIC FREQUENCY MULTIPLIER UTILIZING A PLURALITY
OF SATURABLE MAGNETIC CORES
Filed March 16, 1964
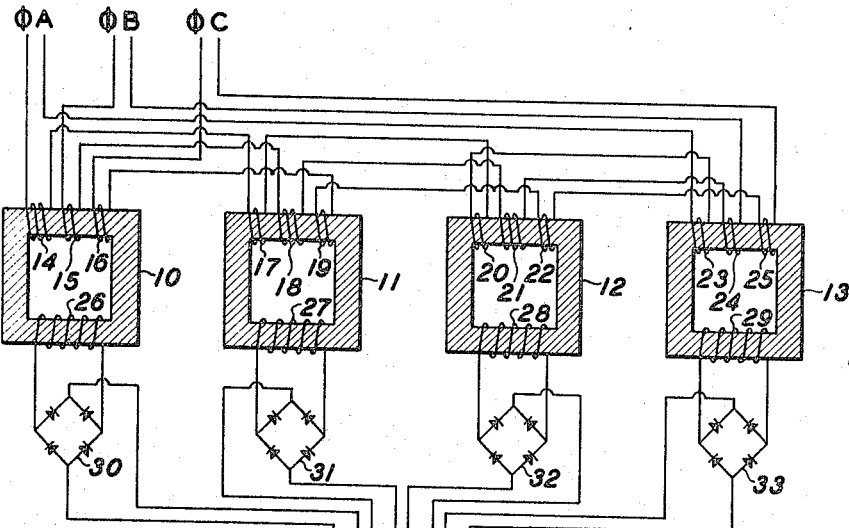
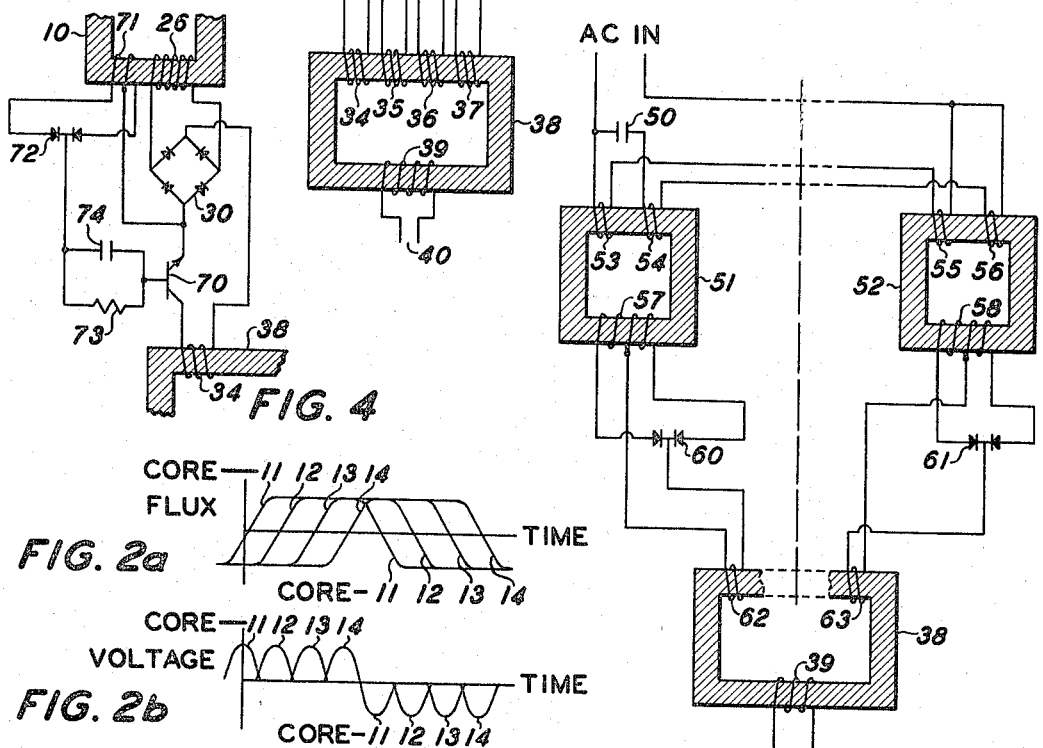
INVENTOR.
STEPHEN B. SAMPLE
BY Anthony D. Cennamo
Joseph F. Rosenthal United States Patent Office 3,311,810
Patented Mar. 28, 1967

3,311,810
STATIC FREQUENCY MULTIPLIER UTILIZING A PLURALITY OF SATURABLE MAGNETIC CORES
Stephen Browning Sample, Urbana, Ill., assignor to Xerox Corporation, Rochester, N.Y., a corporation of New York
Filed Mar. 16, 1964, Ser. No. 352,054
3 Claims. (Cl. 321—68)

ABSTRACT OF THE DISCLOSURE

This invention relates to a static magnetic frequency multiplier having a plurality of saturable magnetic cores for converting electrical power in the power frequency or audio frequency range to electrical power at a higher frequency which is an even multiple of the input frequency.

---

There are many instances where it is desirable to convert electrical power of one frequency to electrical power of a different and higher frequency. The oldest method involves using the input power to drive an electrical motor which drives an alternator operating at the desired higher frequency. This arrangement is simple, but also heavy, expensive, and inefficient. Other means are also known which suffer from some of these same disadvantages. More recently a static, magnetic, non-resonant frequency multiplier has been proposed which overcomes many of these disadvantages. It is, however, inherently limited to multiplication by an odd number. The present invention provides simple reliable, efficient frequency multiplication by an even number.

FIGURE 1 is a schematic circuit diagram of one embodiment of the invention; FIGURE 2 is a set of waveforms encountered in the invention; FIGURE 3 is a schematic circuit diagram of a modified form of the circuit of FIGURE 1; and FIGURE 4 is a schematic circuit diagram of part of the circuit of FIGURE 1 including modifications.

Considering FIGURE 1, there is shown a set of four transformer cores 10, 11, 12 and 13. Four cores are shown for illustrative purposes to show a frequency multiplication by a factor of 4. The number of cores chosen is equal to the desired multiplication factor and must be an even number. Each transformer core has three primary windings, each connected to a different one of the input power phases A, B, and C. All of the windings corresponding to a given phase are connected in series. The use of three input phases is for illustrative purposes only since any number of independent phases greater than 1 may be employed. By independent phases it is meant phases having a phase difference which is neither substantially zero degrees nor substantially 180°. Sinusoidal input voltages are desirable but not essential.

The net magnetizing force acting on each core is the vector sum of the magnetizing forces due to each of the primary coils. The turns ratios of the primary windings on each core should be chosen so that the phase of each successive core is advanced or retarded by 180°/n where $n$ is the number of cores. In terms of FIGURE 1, if the phase of the magnetizing force on one core is taken to be zero degrees then the phases of the other cores differ by 45°, 90°, and 135°, respectively from that of the first core. Assuming identical cores, the vector sum of the magnetizing forces acting on each core should be the same in magnitude and should be chosen so that the core will saturate in approximately $\frac{1}{2}fn$ second where $f$ is the input power frequency and $n$ represents the number of cores. If one core is larger than the others or for some reason has a different total saturation flux, then the total number of primary turns on this core are adjusted to yield the same saturation time. The ratios between the individual primary windings of this core remain the same, however. To a first approximation, the magnetizing forces are calculated as if the entire input voltage appeared across the primary coils associated with a single core. In order to obtain the proper phase for some cores it will generally be necessary to vectorially add one or more primary phases in a negative sense. This is accomplished physically by simply reversing the connections to the coil connected to that phase.

If the reference phase of the system is made equal to that of one of the power supply phases, then one of the cores may be wound with only a single primary winding connected to that power supply phase. Similarly, where three or more input phases are employed, it may be possible to wind some of the other cores with less coils than the number of input phases. It is preferred, however, to use the same number of primary windings on each core and to choose the turns ratios, in accordance with the previously described phase relations, so that the total number of primary turns in each phase is approximately the same. This helps to equalize the amount of power drawn from each primary phase.

Each core is thus driven well into saturation and the flux in each core as a function of time is plotted in FIGURE 2a. As shown in FIGURE 2a, each core switches or changes flux at a different time and at any given time one core is switching and the other cores are saturated. This is why preliminary design of the windings can be made on the assumption that the full supply voltage is applied across a single core. Since each core switches in a small fraction of a cycle, the effect of the individual magnetizing forces need be considered only during this interval. During this short switching interval the magnetizing forces associated with each phase appear, to a first approximation, as if they were linearly related to each other instead of being out of phase to each other. It is for this reason that several different phase windings can be applied to a single core. With ordinary non-saturating transformers this results in disastrously high primary currents.

Cores 10–13 are each provided with a secondary winding 26–29 respectively. The voltage appearing on each of these windings is proportional to the derivative of the magnetic flux and is plotted in FIGURE 2b. Each secondary winding is connected to a full wave rectifier, 30–33 respectively, which rectifies the output of the secondary winding. The rectified output of each secondary winding now appears as a series of uni-polarity pulses as shown in FIGURE 2c. Each rectifier 30–33 is connected to primary winding on a non-saturating transformer core 38. These windings 34–37 are poled so that the windings associated with even numbered ones of cores 10–13 are poled in one direction and windings associated with odd numbered ones of cores 10–13 are poled in the opposite direction. It is assumed that cores 10–13 are numbered consecutively in order of increasing or decreasing phase angle and not necessarily in order of physical position or in order of wiring. Core 38 also has an output or secondary winding 39 which is connected to output terminals 40 of the frequency multiplier device. Core 38 serves to add the rectified voltage pulses derived from cores 10–13, with pulses from alternate cores being reversed in polarity. The result of this addition is the waveform shown in FIGURE 2d. This waveform is an alternating frequency current having a frequency four times that of the input power. If six, eight, ten or more cores were employed the output voltage would also be multiplied by a factor of six, eight, ten or more. Multiplication by any even numbered number starting with 2 is possible but multiplication ratios of 4 or more are preferred.

All the elements shown in FIGURE 1 can conform to conventional engineering practice. Cores 10–13 can be conventional transformer cores of a size and lamination thickness comparable to those used for ordinary power transformers. However, since each core only switches a fraction of the total power the cores may be somewhat smaller than would be chosen for a single transformer handling the full power output. Since the cores are permitted to saturate, less copper in the windings is required than in a normal transformer. Special square loop magnetic materials are neither necessary nor particularly desirable. Tape wound silicon steel C cores are very suitable. The number of turns in coils 26–29, 34–37, and 39 are chosen so that the net transformation ratio will yield the desired output voltage at terminals 40. Rectifiers 30–33 may be of any conventional type. Silicon rectifiers are particularly useful. Core 38 and its associated windings comprise an ordinary non-saturated transformer and can be designed in accordance with ordinary transformer practice.

A modified form of frequency multiplier in accordance with the invention is illustrated in FIGURE 3. Only two cores 51 and 52 are shown, the broken line serving to indicate the optional presence of additional cores and associated components. In this embodiment, the input power is single phase. Two sets of input windings are provided. One set, coils 53 and 55, is series connected directly across the input. The other set, coils 54 and 56, in series connected across the line in series with a phase shifting capacitor 50. By this means a phase difference is provided between coils 53 and 55 on one hand and coils 54 and 56 on the other hand. This phase shift will normally be less than 90°, which is, however, entirely satisfactory. The use of additional inductors or the like for generating a 90° phase difference is well known and may be employed if desired. As in FIGURE 1, the input coil windings are chosen to provide the proper relative phase of the magnetizing force in each core. In accordance with the principles of vector addition, it is not necessary that the phases applied to the two sets of coils have any particular phase relation in order to permit the generation of any arbitrary phase by altering the number of turns on the different coils. The only exception is the previously noted requirement that the phases applied to the coils be neither substantially in phase nor out of phase.

Cores 51 and 52 have secondary windings 57 and 58 respectively, each of which is center tapped. The output voltage of these coils is rectified by full wave rectifiers 60 and 61. The rectifier voltages from secondary coils 57 and 58 is applied to primary windings 62 and 63 respectively on a non-saturating transformer core 38. Center tapped coils 57 and 58 and their associated full wave rectifiers 60 and 61 cooperate to provide exactly the same form of output pulses as is obtained from coils 26 to 29 and rectifiers 30–33 in FIGURE 1. Information given in connection with FIGURE 1 on choice of core sizes and materials, windings, etc. is equally applicable in connection with FIGURE 2.

Frequency multipliers according to this invention are useful in any frequency range in which it is practical to construct transformers having well defined saturation characteristics with reasonable losses. The lower frequency limit is set by the amount of iron and copper which it is feasible to employ in making the transformers. For practical purposes the lower limit is several cycles per second. The upper limit will be in the kilocycle range depending upon available core materials and acceptable core dissipation limits. Although there is no theoretical limit on the multiplication ratios which may be obtained in a single multiplier, high multiplication ratios can be obtained much more economically by cascading several multipliers in series. The multipliers can all be of the type described here or some of the multipliers may be of the prior type adapted for multiplication by odd numbers. Cascading can be accomplished by using the type of input circuit shown in FIGURE 3 to accept the single phase output of the next preceding multiplier. It is also possible to use two multipliers operating in parallel for each multiplier stage. The primary winding ratios of one multiplier can be varied with respect to those of the other so that the outputs are not in phase. The two outputs may be used as a two phase power supply to feed the next stage of the multiplier chain.

In some instances, it may be desirable to prevent the reverse flow of power from the windings on non-saturating transformer 38 to the saturating transformers. This may occur when a voltage is induced on one of the windings on the non-saturating transformer while the saturating transformer connected to this winding is in a saturated condition. One suitable way of preventing reverse power flow is illustrated in FIGURE 4, which is a schematic circuit representation of part of the circuit of FIGURE 1 but including certain modifications. Only portion of one saturating transformer is shown but it is to be understood that the modifications of this figure would be applied in like manner to all transformers. A transistor 70 is placed in series between rectifier 30 and winding 34. This transistor is essentially equivalent to an open switch except when an appropriate forward bias is applied between the emitter and base electrodes of the transistor. This bias is provided by an additional low-voltage winding 71 on core 10. The voltage induced on winding 71 is rectified by rectifier 72 and applied to the base and emitter of transistor 70. A resistor 73, and in some cases a capacitor 72, may be used as shown to control the amount of bias current applied to transistor 70. Since a voltage appears on winding 71 at the same time as on winding 26, transistor 70 becomes forward biased and behaves like a closed switch whenever a voltage appears on winding 26. In this way, power can flow from winding 26 to winding 34 in the same manner and at the same times as in FIGURE 1. However, voltages induced in winding 34, regardless of polarity, cannot cause a flow of current through winding 26 because transistor 70 will not be forward biased at that time. Other forms of switching devices, such as silicon controlled rectifiers, may also be used in place of transistor 70. Where sufficiently low frequencies are involved, even mechanical switches may be adequate. In this embodiment of the invention, winding ratios should be chosen so that the voltages induced on windings 26 and 34 will be compatable with the saturation voltage and breakdown voltage of transistor 70 or its equivalent.

What is claimed is:
1. A static magnetic frequency multiplier adapted to multiply electrical power of an input frequency by a factor $n$, $n$ being an even integer, comprising in combination:
   $n$ saturable magnetic cores,
   at least two sets of primary windings on said cores,
   each of said sets of windings including windings on at least two of said cores,
   each of said sets of windings being series connected and adapted to be connected to a source of input voltage of common frequency and different independent phase,
   said primary windings being connected so that the cores form a sequence in which the phase of the magnetizing force in each successive core advances by $180°/n$ of input frequency phase with respect to the preceding core,
   the magnetizing force in each core being sufficient to maintain the core saturated over at least one half of each half cycle of magnetizing force,
   a secondary winding on each saturable core,
   all windings on each core being in flux-sharing relationship,
   individual rectification means connected to each secondary winding to produce a series of unipolarity pulses whereby each rectifying means produces a pair of equally spaced unipotential pulses for each cycle of input frequency, each said rectifying means producing a pair of pulses displaced from those of the next preceding rectifying means by $180°/n$, means to invert the polarity of pulses from alternate rectifying means, and means to add all said pulses together to additively combine all said pulses.

2. A static magnetic frequency multiplier adapted to multiply electrical power of an input frequency by a factor $n$, $n$ being an even integer, comprising in combination:

$n$ saturable magnetic cores, at least two sets of primary windings on said cores,
  each of said sets of windings including windings on at least two of said cores,
  each of said sets of windings being series connected and adapted to be connected to a source of input voltage of common frequency and different independent phase,
  said primary windings being connected so that the cores form a sequence in which the phase of the magnetizing force in each successive core advances by $180°/n$, of input frequency phase with respect to the preceding core,
  the magnetizing force in each core being sufficient to maintain the core saturated over about $(1-1/n)$ of each half cycle of magnetizing force,
  a secondary winding on each saturable core,
  all windings on each core being in flux-sharing relationship,
  individual rectification means connected to each secondary winding to produce a series of unipolarity pulses, a non-saturating transformer, $n$ primary windings on said non-saturating transformer each said winding being connected to an individual rectifying means,
  windings associated with adjacent cores in said sequence being poled to induce flux in opposite senses,
  and an output winding on said non-saturating transformer.

3. A static magnetic frequency multiplier adapted to multiply electrical power of an input frequency by a factor $n$, $n$ being an even integer, comprising in combination:

$n$ saturable magnetic cores, at least two sets of primary windings on said cores,
  each of said sets of windings including windings on at least two of said cores,
  each of said sets of windings being series connected and adapted to be connected to a source of input voltage of common frequency and different independent phase,
  said primary windings being connected so that the cores form a sequence in which the phase of the magnetizing force in each successive core advances by $180°/n$, of input frequency phase with respect to the preceding core,
  the magnetizing force in each core being sufficient to maintain the core saturated over about $(1-1/n)$ of each half cycle of magnetizing force,
  a secondary winding on each saturable core,
  all windings on each core being in flux-sharing relationship,
  individual rectification means connected to each secondary winding to produce a series of unipolarity pulses, a non-saturating transformer, $n$ primary windings on said non-saturating transformer each said winding being connected to an individual rectifying means,
  windings associated with adjacent cores in said sequence being poled to induce flux in opposite senses,
  control means connected between the secondary winding on each saturable core and the corresponding primary winding on the non-saturating transformer, said control means being adapted to permit the flow of power from said secondary windings to said primary windings while blocking the flow of power from said primary windings to said secondary windings,
  and an output winding on said non-saturating transformer.

References Cited by the Examiner

UNITED STATES PATENTS

| 1,917,921 | 7/1933 | Burton | 321—68 |
| 2,580,446 | 1/1952 | Lovell et al. | 321—68 |

JOHN F. COUCH, *Primary Examiner.*

G. GOLDBERG, *Assistant Examiner.*